United States Patent
Lee

(10) Patent No.: US 8,700,217 B2
(45) Date of Patent: *Apr. 15, 2014

(54) THERMAL PROTECTION METHOD AND RELATED SYSTEM FOR A COMPUTER SYSTEM

(71) Applicant: Wistron Corporation, New Taipei (TW)

(72) Inventor: Yin-Chieh Lee, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,954

(22) Filed: Nov. 1, 2012

(65) Prior Publication Data

US 2013/0061081 A1 Mar. 7, 2013

Related U.S. Application Data

(63) Continuation of application No. 12/815,391, filed on Jun. 14, 2010, now Pat. No. 8,332,074.

(30) Foreign Application Priority Data

Oct. 30, 2009 (TW) .................................... 98136995

(51) Int. Cl.
*G06F 19/00* (2011.01)

(52) U.S. Cl.
USPC ............................ 700/276; 700/299; 713/300

(58) Field of Classification Search
USPC ............ 700/276, 299, 300; 713/300; 172/132
See application file for complete search history.

(56) References Cited

U.S. PATENT DOCUMENTS

| 5,752,011 | A * | 5/1998 | Thomas et al. ................ 713/501 |
| 5,838,578 | A * | 11/1998 | Pippin ........................... 327/512 |
| 5,870,614 | A * | 2/1999 | Ang ............................... 713/320 |
| 6,198,245 | B1 * | 3/2001 | Du et al. ........................ 318/471 |
| 6,212,644 | B1 * | 4/2001 | Shimoda et al. ............... 713/324 |
| 6,225,911 | B1 * | 5/2001 | Nagamasa et al. ............ 340/635 |
| 6,526,333 | B1 * | 2/2003 | Henderson et al. ........... 700/300 |
| 6,647,320 | B1 * | 11/2003 | Inoue ............................. 700/300 |
| 7,275,368 | B2 * | 10/2007 | Furuta et al. .................... 60/329 |
| 7,331,760 | B2 * | 2/2008 | Furuta .............................. 416/1 |
| 2002/0104030 | A1 * | 8/2002 | Ahn ............................... 713/310 |

FOREIGN PATENT DOCUMENTS

TW 200415459 8/2004

* cited by examiner

*Primary Examiner* — Kidest Bahta
(74) *Attorney, Agent, or Firm* — Winston Hsu; Scott Margo

(57) ABSTRACT

A thermal protection method for a computer system comprising a thermal detector, a controller, and an input/output system, the thermal protection method including the thermal detector measuring the temperature of the computer system and generating a temperature value, the controller comparing the temperature value and a threshold value, the controller periodically transmitting an over-temperature indication signal to the input/output system when the temperature value is not lower than the threshold value, the input/output system executing a temperature-lowering process when receiving the over-temperature indication signal, and the controller executing a compulsory thermal protection process when determining that the temperature-lowering process is unsuccessfully executed.

15 Claims, 4 Drawing Sheets

THERMAL PROTECTION METHOD AND RELATED SYSTEM FOR A COMPUTER SYSTEM

CROSS REFERENCE TO RELATED APPLICATIONS

This is a continuous application of U.S. application Ser. No. 12/815,391 filed on Jun. 14, 2010 and entitled "THERMAL PROTECTION METHOD AND RELATED SYSTEM FOR A COMPUTER SYSTEM", which is included in its entirety herein by reference.

BACKGROUND OF THE INVENTION

1. Field of the Invention

The present invention relates to a thermal protection method and related system for a computer system, and more particularly, to a thermal protection method and related system wherein a keyboard controller of the computer system executes different thermal protection processes based on whether or not receiving the responded signals corresponding to over-temperature indication signals.

2. Description of the Prior Art

With the progress of electronic technology, hardware levels of computer systems, such as desktops or laptops, have ascended increasingly to support high speed operations and complex image processing functionalities; in the meanwhile, a trend to minimization and lightening in appearance design has also become significant to meet the needs of both efficiency and artistry of the public. While the computer system is performing a high-speed access, the system temperature is raising promptly. Without adequate heat dissipation designs or thermal protection functions, the system temperature would easily exceed the safety scope in which the internal devices of computer system are under normal operation, and hence results in decreasing of efficiency or even permanent damages to devices.

A keyboard controller, disposed on the motherboard of prior art computer system, is utilized for processing signals inputted from keyboards and mice, and for detecting ambient temperature. When the system is over-temperature, the keyboard controller sends out an over-temperature indication signal, informing a basic input/output system to decelerate the central processing unit (CPU). After receiving the over-temperature indication signal, the basic input/output system must respond an acknowledgement signal to the keyboard controller. If the keyboard controller has not yet received the acknowledgement signal, the keyboard controller continues transmitting the over-temperature indication signals to the basic input/output system until the keyboard controller detects that the system temperature has reached a certain value, and controls the computer system to turnoff. For example, when the system temperature reaches 80 centigrade, the keyboard controller promptly sends out the over-temperature indication signal. If the keyboard controller has not yet received the acknowledgement signal outputted from the basic input/output system, the keyboard controller continues sending out the over-temperature indication signals until the system temperature reaches 100 centigrade, and at last turns off the power supply of computer system.

The above-mentioned thermal protection method has at least two drawbacks. First, within the duration that the keyboard controller continues sending out the over-temperature indication signals until the system be turned off, the computer system operates under a long-term high-temperature and results in overly increase of the probability of damage to internal devices; second, through the acknowledgement signal, the keyboard controller can only be aware that the basic input/output system has received the over-temperature indication signal, however, the keyboard controller cannot know whether the basic input/output system has controlled the central processing unit to decrease the execution speed or whether the central processing unit has finished deceleration. Therefore, the prior art thermal protection method cannot thoroughly protect the computer system from high temperature damages.

SUMMARY OF THE INVENTION

It is therefore a primary objective of the claimed invention to provide a thermal protection method and related system for a computer system.

The present invention discloses a thermal protection method for a computer system comprising a thermal detector, a controller, and an input/output system. The thermal protection method includes the thermal detector measuring the temperature of the computer system and generating a temperature value, the controller comparing the temperature value and a threshold value, the controller periodically transmitting an over-temperature indication signal to the input/output system when the temperature value is not lower than the threshold value, the input/output system executing a temperature-lowering process when receiving the over-temperature indication signal, and the controller executing a compulsory thermal protection process when determining that the temperature-lowering process is unsuccessfully executed.

The present invention further discloses a thermal protection system for a computer system including a thermal detector, for measuring the temperature of the computer system to generate a temperature value, an input/output system, for executing a temperature-lowering process according to an over-temperature indication signal, and a controller, coupled to the thermal detector and the input/output system, for determining whether the temperature-lowering process is successfully executed, and for executing a compulsory thermal protection process when the temperature-lowering process is unsuccessfully executed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
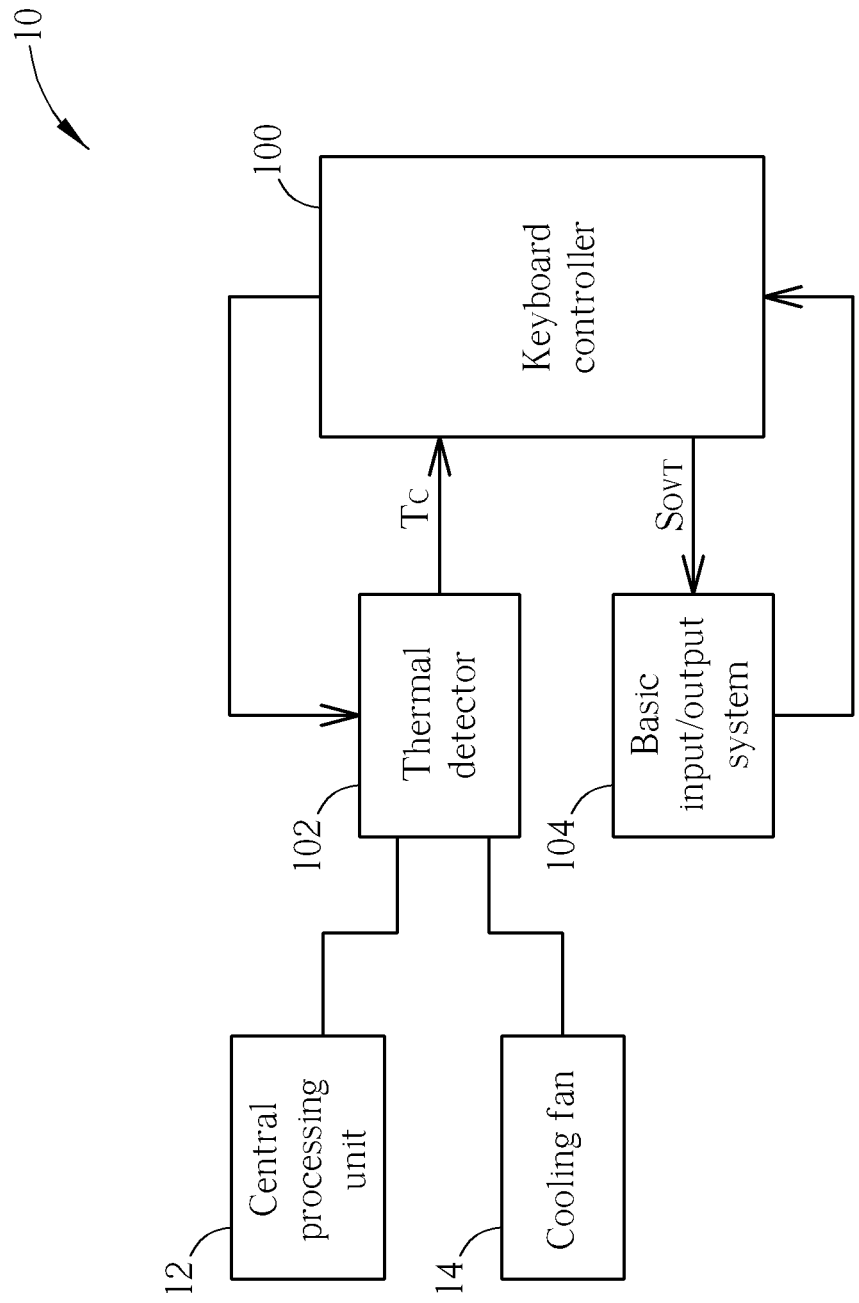
FIG. 1 is a block diagram of a thermal protection system of a computer system according to an embodiment of the present invention.

Please refer to FIG. 1. FIG. 1 is a block diagram of a thermal protection system 10 of a computer system according to an embodiment of the present invention, and the thermal protection system 10 can be applied to the computer systems, such as desktops, laptops, and similar computer systems. The thermal protection system 10 comprises a keyboard controller 100, a thermal detector 102, and a basic input/output system 104.

The thermal detector 102 is coupled to a central processing unit 12 of the computer system and a cooling fan 14 mounted on the central processing unit 12, for measuring the temperature of the computer system to generate a temperature value $T_C$, usually the temperature of the central processing unit 12. The basic input/output system. 104 is utilized for performing a temperature-lowering process according to an over-temperature indication signal $S_{OVT}$. The keyboard controller 100 is coupled to the thermal detector 102 and the basic input/output system 104, and is utilized for transmitting the over-temperature indication signal $S_{OVT}$ to the basic input/output system 104 when the temperature value $T_C$ is too high, for determining whether the basic input/output system 104 successfully executes a temperature-lowering process, and for controlling the thermal detector 102 and the basic input/output system 104 to perform the thermal protection process thereof, to prevent the computer system from high temperature damages.

Please note that the above-mentioned functions of the keyboard controller 100 and the basic input/output system 104 are merely in the light of the thermal protection system 10; in practice, the keyboard controller 100 and the basic input/output system 104 further comprise other functions. For example, the basic input/output system 104 is capable of controlling the start-up process, the system setting, and the input/output of signals between the computer system and the peripheral devices of the computer system, but those are not narrated herein.

Figure 2:
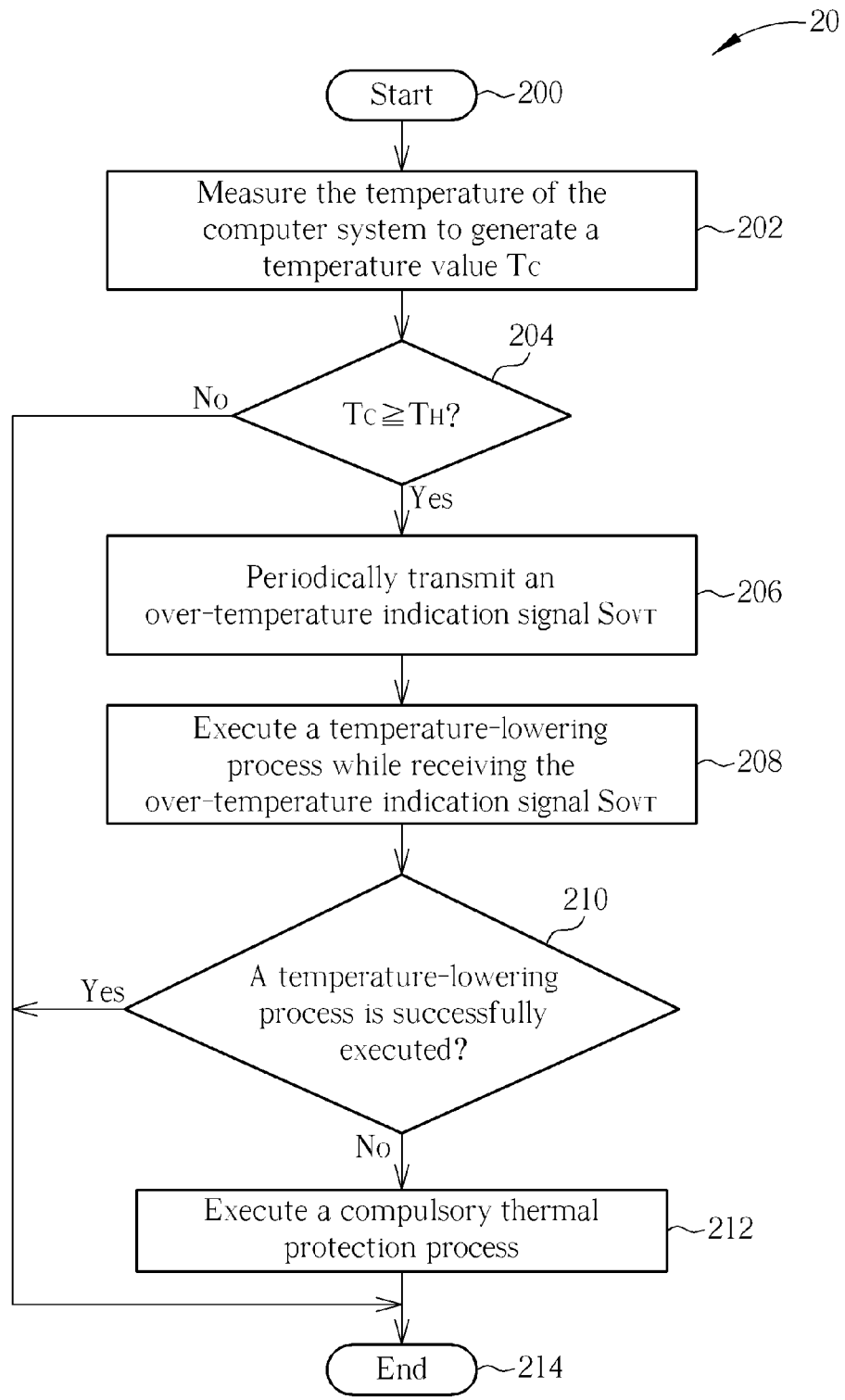
FIG. 2 is a flowchart of a thermal protection process according to an embodiment of the present invention.

As to the operating process of the protection system 10 of FIG. 1, please refer to FIG. 2. FIG. 2 is a flowchart of a thermal protection process 20 according to an embodiment of the present invention. The thermal protection process 20 includes the following steps:

Step 200: Start.

Step 202: The thermal detector 102 measures the temperature of the computer system to generate a temperature value $T_C$.

Step 204: The keyboard controller 100 compares the temperature value $T_C$ measured by the thermal detector 102 with a threshold value $T_H$. If the temperature value $T_C$ is higher than or equal to the threshold value $T_H$, perform step 206; if the temperature value $T_C$ is lower than the threshold value $T_H$, perform step 214.

Step 206: The keyboard controller 100 periodically transmits an over-temperature indication signal $S_{OVT}$ to the basic input/output system 104.

Step 208: The basic input/output system 104 executes a temperature-lowering process while receiving the over-temperature indication signal $S_{OVT}$.

Step 210: The keyboard controller 100 determines whether the basic input/output system 104 executes the temperature-lowering process successfully. If the keyboard controller 100 determines that the temperature-lowering process is successfully executed, perform step 214; if the keyboard controller 100 determines that the temperature-lowering process is unsuccessfully executed, perform step 212.

Step 212: The keyboard controller 100 executes a compulsory thermal protection process.

Step 214: End.

According to the thermal protection process 20, the thermal detector 102 measures the temperature of the computer system to generate a temperature value $T_C$. The keyboard controller 100 receives the temperature value $T_C$ from the thermal detector 102, and compares the temperature value $T_C$ with a threshold value $T_H$. The threshold value $T_H$ is set to be the temperature determined over-temperature by the central processing unit 12, such as 70 centigrade or 80 centigrade, which relates to the hardware specifications and the user requirements of the computer system, and is not limited to specific temperature value. When the temperature value $T_C$ is lower than the threshold value $T_H$, it indicates that the temperature of the central processing unit 12 is within the safety scope, and hence the thermal protection process 20 ends. When the temperature value $T_C$ is higher than or equal to the threshold value $T_H$, it indicates that the central processing unit 12 is over-temperature; meanwhile, in order to avoid high temperature damages to the central processing unit 12 and other devices of the computer system, according to step 206, the keyboard controller 100 starts to periodically transmit an over-temperature indication signal $S_{OVT}$ to the basic input/output system 104, such as transmitting an over-temperature indication signal $S_{OVT}$ every 500 milliseconds. When the hardware of the computer system is under normal operation, the basic input/output system 104 responds an acknowledgement signal to the keyboard controller 100 after receiving an over-temperature indication signal $S_{OVT}$, indicating that the over-temperature indication signal $S_{OVT}$ has been received, and the keyboard controller 100 also confirms whether the acknowledgement signal has been received.

When the keyboard controller 100 starts to transmit the over-temperature indication signal $S_{OVT}$ the basic input/output system 104 executes a temperature-lowering process while receiving the over-temperature indication signal $S_{OVT}$, such as decelerating the execution speed of the central processing unit 12, to decrease the temperature of computer system. In the meanwhile, the keyboard controller 100 continues to determine whether the basic input/output system 104 successfully executes the temperature-lowering process. When the keyboard controller 100 determines that the basic input/output system 104 has successfully executed the temperature-lowering process, it indicates that the temperature of the central processing unit 12 has been controlled within the safety scope, and hence the thermal protection process 20 ends. When the keyboard controller 100 determines that the basic input/output system 104 has not successfully execute the temperature-lowering process, the keyboard controller 100 executes a compulsory thermal protection process, such as turning off the power supply of the computer system, or setting the revolution of the cooling fan 14 to a maximum value through the thermal detector 102, to lower the temperature of the central processing unit 12 as soon as possible. Therefore, when the basic input/output system 104 unsuccessfully executes the temperature-lowering process and the computer system does not successfully lower the temperature, the keyboard controller 100 is able to perform the thermal protection process to protect the computer system from high temperature damages.

The prior art keyboard controller merely continues to transmit the over-temperature indication signal to the basic input/output system, and is merely aware of whether the basic input/output system has received the over-temperature indication signal. Both of the above-mentioned processes cannot guarantee that the basic input/output system is able to perform the temperature-lowering process successfully. When a crash occurs in the computer system, the prior art keyboard controller may continue to send out the over-temperature indication signal until the computer system be turned off, resulting in a long-term high-temperature execution of the computer system. Compared to the prior art keyboard controller, the keyboard controller 100 is able to determine whether the basic input/output system 104 executes the temperature-lowering process successfully, and performs the compulsory thermal protection process when the temperature-lowering process is unsuccessfully executed according to the thermal protection process 20. Therefore, the computer system applying the keyboard controller 100 and the thermal protection process 20 can preferably avoid the high temperature damages to the hardware devices.

The present invention enables the keyboard controller 100 to determine more precisely whether the temperature-lowering process is successfully executed. The keyboard controller 100 not only determine the temperature-lowering process is unsuccessfully executed while not receiving the acknowledgement signal; but even after the keyboard controller 100 has received the acknowledgement signal, the keyboard controller 100 reconfirms whether the temperature of the computer system is lowered, herewith determines whether the temperature-lowering process is successfully executed. As to a further embodiment of the step 210 of the thermal protection process 20, it is depicted in FIG. 3 and FIG. 4.

Figure 3:
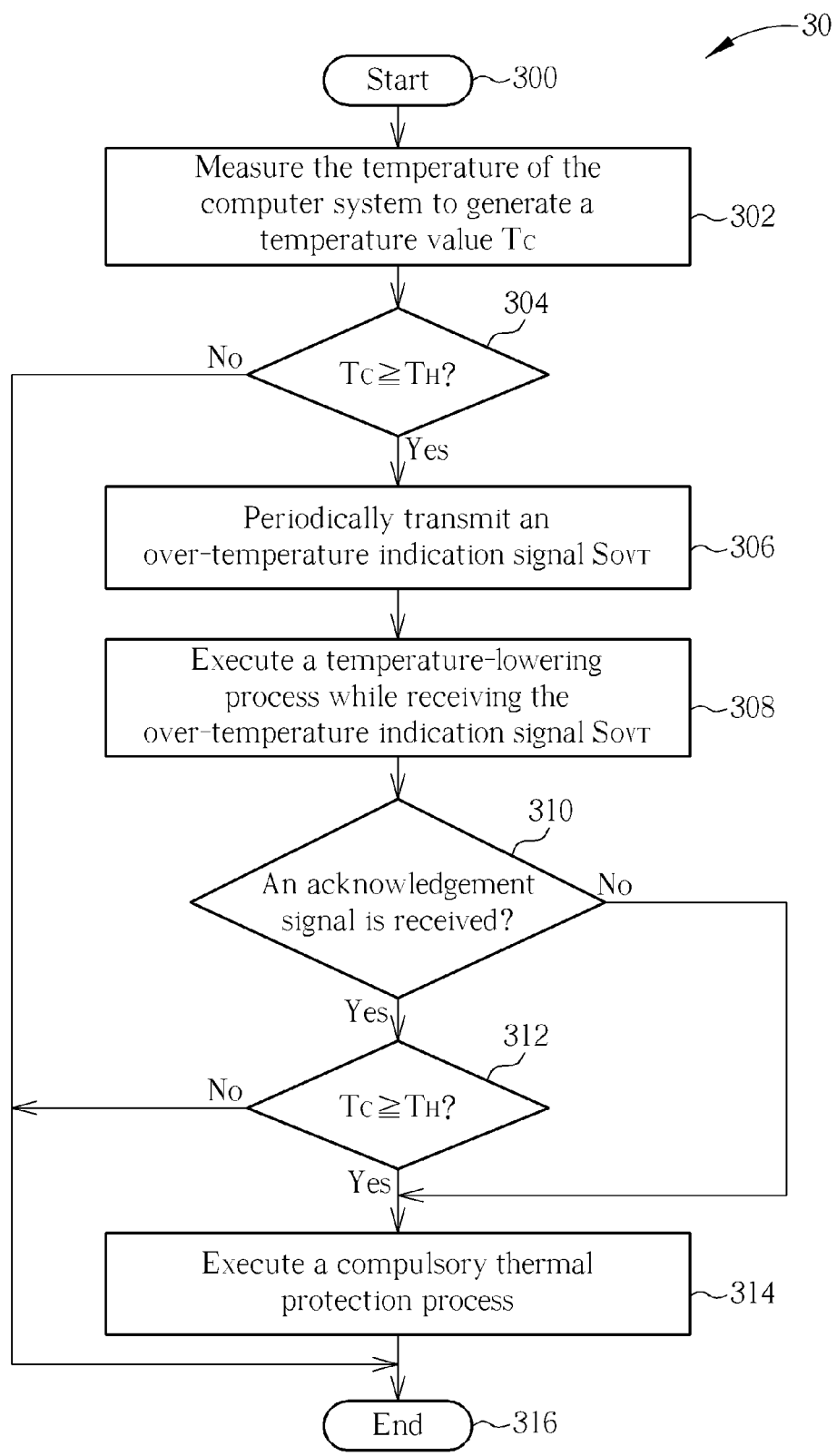
FIG. 3 is a flowchart of a thermal protection process according to the present invention.
Figure 4:
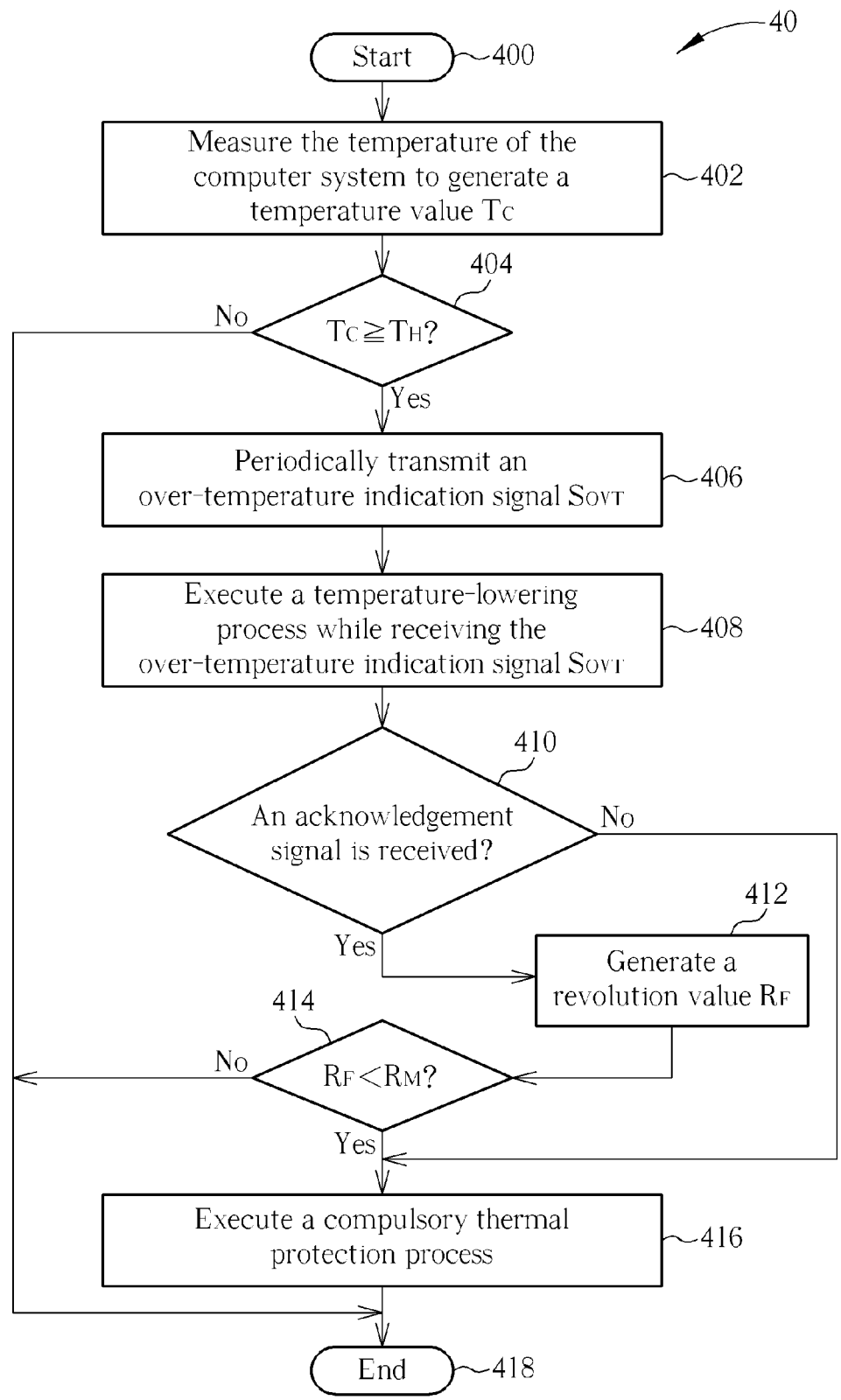
FIG. 4 is a flowchart of a thermal protection process according to an embodiment of the present invention.

Please refer to FIG. 3. FIG. 3 is a flowchart of a thermal protection process 30 according to the present invention. The thermal protection process 30 is applicable in the thermal protection system in FIG. 1, comprising the following steps:

Step 300: Start.

Step 302: The thermal detector 102 measures the temperature of the computer system to generate a temperature value $T_C$.

Step 304: The keyboard controller 100 compares the temperature value $T_C$ measured by the thermal detector 102 with a threshold value $T_H$. If the temperature value $T_C$ is higher than or equal to the threshold value $T_H$, perform step 306; if the temperature value $T_C$ is lower than the threshold value $T_H$, perform step 316.

Step 306: The keyboard controller 100 periodically transmits an over-temperature indication signal $S_{OVT}$ to the basic input/output system 104.

Step 308: The basic input/output system 104 executes a temperature-lowering process while receiving the over-temperature indication signal $S_{OVT}$.

Step 310: After transmitting the over-temperature indication signal $S_{OVT}$, the keyboard controller 100 detects whether an acknowledgement signal responded by the basic input/output system 104 is received. If the keyboard controller 100 does not receive the acknowledgement signal after transmitting the over-temperature indication signal $S_{OVT}$ for a predetermined duration, perform step 314; if the keyboard controller 100 has received the acknowledgement signal, perform step 312.

Step 312: The keyboard controller 100 compares the temperature value $T_C$ measured by the thermal detector 102 with a threshold value $T_H$. If the temperature value $T_C$ is higher than or equal to the threshold value $T_H$, perform step 314; if the temperature value $T_C$ is lower than the threshold value $T_H$, perform step 316.

Step 314: The keyboard controller 100 executes a compulsory thermal protection process.

Step 316: End.

Step 300 to step 308 were depicted in the above thermal protection process 20 and are not narrated herein. According to step 310, after every transmission of the over-temperature indication signal $S_{OVT}$, the keyboard controller 100 detects whether an acknowledgement signal responded by the basic input/output system 104 has been received. If not receiving the acknowledgement signal after transmitting the over-temperature indication signal $S_{OVT}$ for a predetermined duration, the keyboard controller 100 will execute a compulsory thermal protection process. On the contrary, if the keyboard controller 100 has received the acknowledgement signal within the predetermined duration, the keyboard controller 100 reconfirms whether the temperature of the computer system is lowered. Please note that the above-mentioned predetermined duration equals the total time for the keyboard controller 100 to periodically transmit the over-temperature indication signal, which also indicates that how many times for the keyboard controller 100 to transmit the over-temperature indication signal $S_{OVT}$. Calculation of the predetermined duration can be fulfilled by a timer or a counter. For example, assume the predetermined duration is 2 seconds, when the keyboard controller 100 has received the acknowledgement signal within 2 seconds after transmitting the over-temperature indication signal $S_{OVT}$, the keyboard controller 100 further determines whether the temperature-lowering process is effectively performed by the basic input/output system 104; on the contrary, when the keyboard controller 100 does not receive the acknowledgement signal within 2 seconds after transmitting the over-temperature indication signal $S_{OVT}$, the keyboard controller 100 determines that the computer system maybe crashed, and performs to step 314 of executing the compulsory thermal protection process, such as turning off the power supply of the computer system.

It can be shown from the above that the keyboard controller 100 performs different processes based on whether it has received the acknowledgement signal corresponding to the over-temperature indication signal, and the keyboard controller 100 is capable of preferably determining whether the temperature-lowering process is successfully executed by the basic input/output system 104, which is opposite to the operation of prior art keyboard controller that even though transmitting the over-temperature indication signal, the prior art keyboard controller cannot be aware of whether the computer system has departed from the over-temperature status.

According to step 312, after receiving the acknowledgement signal, the keyboard controller 100 compares the temperature value $T_C$ received from the thermal detector 102 with the threshold value $T_H$. When the temperature value $T_C$ is higher than or equal to the threshold value $T_H$, it indicates that despite that the basic input/output system 104 has received the over-temperature indication signal $S_{OVT}$, the basic input/output system 104 fails to execute the temperature-lowering process, and hence, the temperature of the central processing unit 12 still exceeds the safety scope. Meanwhile, according to step 314, the keyboard controller 100 executes a compulsory thermal protection process, which can be turning off the power supply of the computer system, or setting the revolution value of the cooling fan 14 to a higher predetermined revolution value, such as the maximum revolution value of the cooling fan 14, through the thermal detector 102. When the temperature value $T_C$ is lower than the threshold value $T_H$, it indicates that the basic input/output system 104 successfully executed the temperature-lowering process, thereof, the thermal protection process 30 ends.

Please note that in a variation embodiment of the thermal protection process 30, the keyboard controller 100 may not compare the temperature value $T_C$ with the threshold value $T_H$ but directly execute the compulsory thermal protection process after a predetermined duration.

In brief, in the thermal protection process 30, the compulsory thermal protection process is performed to decrease the time when the central processing unit 12 is running at high temperature in accordance with setting of the predetermined duration, and different processes are executed according to whether or not receiving the acknowledgement signal. Therefore, when the computer system crashes or the basic input/output system 104 executes an unsuccessful temperature-lowering process, the keyboard controller 100 is capable of executing adequate thermal protection processes to successfully avoid the high temperature damages to the internal devices of the computer system.

Please note that the thermal protection process 30 is merely an embodiment of the present invention, and variations and modifications can be made by those skilled in the art accordingly. Please refer to FIG. 4. FIG. 4 is a flowchart of a thermal protection process 40 according to an embodiment of the present invention. The thermal protection process 40 is also utilized in the keyboard controller 100 to protect the computer system from high temperature damages. The thermal protection process 40 comprises the following steps:

Step 400: Start.

Step 402: The thermal detector 102 measures the temperature of the computer system to generate a temperature value $T_C$.

Step 404: The keyboard controller 100 compares the temperature value $T_C$ measured by the thermal detector 102 with a threshold value $T_H$. If the temperature value $T_C$ is higher than or equal to the threshold value $T_H$, perform step 406; if the temperature value $T_C$ is lower than the threshold value $T_H$, perform step 418.

Step 406: The keyboard controller 100 periodically transmits an over-temperature indication signal $S_{OVT}$ to the basic input/output system 104.

Step 408: The basic input/output system 104 executes a temperature-lowering process while receiving the over-temperature indication signal $S_{OVT}$.

Step 410: After transmitting the over-temperature indication signal $S_{OVT}$, the keyboard controller 100 detects whether an acknowledgement signal responded by the basic input/output system 104 has been received. If the keyboard controller 100 does not receive the acknowledgement signal after transmitting the over-temperature indication signal $S_{OVT}$ for a predetermined duration, perform step 416; if the keyboard controller 100 has received the acknowledgement signal, perform step 412.

Step 412: The keyboard controller 100 generates a revolution value $R_F$ of the cooling fan 14.

Step 414: The keyboard controller 100 compares the revolution value $R_F$ with a predetermined revolution value $R_M$. If the revolution value $R_F$ is lower than the predetermined revolution value $R_M$, perform step 416; if the revolution value $R_F$ already equals to the predetermined revolution value $R_M$, perform step 418.

Step 416: The keyboard controller 100 executes a compulsory thermal protection process.

Step 418: End.

The thermal protection process 40 in FIG. 4 and the thermal protection process 30 in FIG. 3 are very much alike, and the identical parts are not narrated herein. The different part lies in step 412 and step 414. The keyboard controller 100 receives the revolution value $R_F$ of the cooling fan 14 through the thermal detector 102, and compares the revolution value $R_F$ with a predetermined revolution value $R_M$. The predetermined revolution value $R_M$ can be the maximum revolution value of the cooling fan 14, or a user-defined higher revolution value. If the revolution value $R_F$ is lower than the predetermined revolution value $R_M$, the keyboard controller 100 executes the compulsory thermal protection process, setting the revolution of the cooling fan 14 to the predetermined revolution value $R_M$ through the thermal detector 102; if the revolution value $R_F$ of the cooling fan 14 already equals to the predetermined revolution value $R_M$, the thermal protection process 40 ends. In addition, when the keyboard controller 100 has not received the acknowledgement signal, since what results in this situation is more probably to be a system crash, under this situation, the compulsory thermal protection process executed by the keyboard controller 100 is turning off the power supply of the computer system.

Please note that the thermal protection process 30 and the thermal protection process 40 are preferable embodiments of the present invention, wherein the compulsory thermal protection process executed by the keyboard controller 100 can be "setting the revolution of the cooling fan 14 to the maximum revolution value" or "turning off the power supply of the computer system", chosen by practical requirements. The thermal protection processes 20, 30 and 40 are realized by software in the keyboard controller 100.

To sum up, according to embodiments of the present invention, the keyboard controller of the computer system is capable of the functionality of transmitting the over-temperature indication signal in the predetermined duration to avoid a long-term high-temperature execution of computer system. In the situation that the keyboard controller has not received the acknowledgement signal in the predetermined duration, the keyboard controller directly turning off the power supply of the computer system, or adjusting the revolution of the cooling fan to the maximum revolution value. Moreover, in the situation that the keyboard controller has received the acknowledgement signal, the keyboard controller determines whether the temperature-lower process is successfully executed according to the present system temperature value or the revolution value of the cooling fan of the central processing unit, and is hence more effective to prevent the high temperature damages to the internal devices of computer system than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thermal protection method for a computer system comprising a thermal detector, a controller electrically connected to the thermal detector, and an input/output system, the thermal protection method comprising:

measuring the temperature of the computer system and generating a temperature value via the thermal detector;

comparing the temperature value and a threshold value via the controller;

periodically transmitting an over-temperature indication signal to the input/output system via the controller when the temperature value is not lower than the threshold value;

executing a temperature-lowering process via the input/output system when receiving the over-temperature indication signal; and executing a compulsory thermal protection process via the controller when determining that the temperature-lowering process is unsuccessfully executed;

wherein the compulsory thermal protection process is setting a revolution value of a cooling fan of a central processing unit of the computer system to a predetermined revolution value.

2. The thermal protection method of claim 1, further comprising:

when the controller has transmitted the over-temperature indication signal for a first predetermined duration and not receive an acknowledgement signal responded by the input/output system yet, the controller determining that the temperature-lowering process is unsuccessfully executed.

3. The thermal protection method of claim 2, wherein the first predetermined duration is the time for the controller to transmit the over-temperature indication signal for a predetermined number of times.

4. The thermal protection method of claim 1, wherein the compulsory thermal protection process is turning off the power supply of the computer system.

5. The thermal protection method of claim 1, wherein the predetermined revolution value is the maximum revolution value of the cooling fan.

6. The thermal protection method of claim 1, wherein the controller is a keyboard controller.

7. The thermal protection method of claim 1, wherein the input/output system is a basic input/output system.

8. A thermal protection system coupled to a computer system comprising:
   a thermal detector, measuring the temperature of the computer system to generate a temperature value;
   an input/output system, executing a temperature-lowering process according to an over-temperature indication signal; and
   a controller, electrically connected to the thermal detector and the input/output system, determining whether the temperature-lowering process is successfully executed, and executing a compulsory thermal protection process when the temperature-lowering process is unsuccessfully executed;
   wherein the compulsory thermal protection process is setting a revolution value of a cooling fan of a central processing unit of the computer system to a predetermined revolution value.

9. The thermal protection system of claim 8, wherein the controller is further utilized for comparing the temperature value with a threshold value, and for periodically transmitting an over-temperature indication signal to the input/output system when the temperature value is not lower than the threshold value.

10. The thermal protection system of claim 8, wherein when the controller has not yet received an acknowledgement signal corresponding to the over-temperature indication signal from the input/output system after a first predetermined duration is reached, the controller determines that the temperature-lowering process is unsuccessfully executed.

11. The thermal protection system of claim 10, wherein the first predetermined duration is the time for the controller to transmit the over-temperature indication signal for a predetermined number of times.

12. The thermal protection system of claim 8, wherein the compulsory thermal protection process is turning off the power supply of the computer system.

13. The thermal protection system of claim 8, wherein the predetermined revolution value is the maximum revolution value of the cooling fan.

14. The thermal protection system of claim 8, wherein the controller is a keyboard controller.

15. The thermal protection system of claim 8, wherein the input/output system is a basic input/output system.

\* \* \* \* \*